US012731219B2

(12) United States Patent
Shi

(10) Patent No.: US 12,731,219 B2
(45) Date of Patent: Sep. 8, 2026

(54) METHOD AND DEVICE FOR GENERATING IMAGE SET, AND COMPUTER-READABLE STORAGE MEDIUM

(71) Applicant: BOE Technology Group Co., Ltd., Beijing (CN)

(72) Inventor: Ruijiao Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/704,431

(22) PCT Filed: Jul. 31, 2023

(86) PCT No.: PCT/CN2023/110271
§ 371 (c)(1),
(2) Date: Apr. 24, 2024

(87) PCT Pub. No.: WO2024/041318
PCT Pub. Date: Feb. 29, 2024

(65) Prior Publication Data

US 2025/0245785 A1 Jul. 31, 2025

(30) Foreign Application Priority Data

Aug. 23, 2022 (CN) ......................... 202211017275.7

(51) Int. Cl.
*G06V 40/00* (2022.01)
*G06T 3/40* (2006.01)
(Continued)

(52) U.S. Cl.
CPC .................. *G06T 5/50* (2013.01); *G06T 3/40* (2013.01); *G06T 7/12* (2017.01); *G06V 10/56* (2022.01);
(Continued)

(58) Field of Classification Search
CPC .... G06T 5/50; G06T 7/12; G06T 3/40; G06T 2207/20081; G06T 2207/20084;
(Continued)

(56) References Cited

U.S. PATENT DOCUMENTS 10,475,248 B1 11/2019 Klein et al.
10,909,349 B1 2/2021 Tripathi et al.
(Continued)

FOREIGN PATENT DOCUMENTS

CN 107622504 A 1/2018
CN 109544496 A 3/2019
(Continued)

OTHER PUBLICATIONS

Shi, Jintao, et al. "Research on foreign matter monitoring of power grid with faster R-CNN based on sample expansion." Power System Technology 44.1 (2020): 44-51.
(Continued)

*Primary Examiner* — King Y Poon
(74) *Attorney, Agent, or Firm* — IPro, PLLC

(57) ABSTRACT

Embodiments of the present disclosure provide an image set generation method. The image set is configured to train a detection model for an anomalous organism in a restricted zone and comprises a plurality of sample images; and the method comprises generating each sample image according to steps as below: acquiring at least one target image according to a pre-acquired first image set, wherein the target image is an image of the anomalous organism that is segmented from a first image in the first image set; and synthesizing the target image with a background image to acquire the sample image, wherein the first image set comprises a plurality of first images, and the background image is acquired by shooting the restricted zone.

18 Claims, 10 Drawing Sheets

(51) Int. Cl.

| | |
|---|---|
| ***G06T 5/50*** | (2006.01) |
| ***G06T 7/12*** | (2017.01) |
| ***G06V 10/56*** | (2022.01) |
| ***G06V 10/60*** | (2022.01) |
| ***H04N 1/60*** | (2006.01) |

(52) U.S. Cl.
CPC ............... *G06V 10/60* (2022.01); *H04N 1/60* (2013.01); *G06T 2207/20081* (2013.01); *G06T 2207/20084* (2013.01); *G06T 2207/20221* (2013.01)

(58) Field of Classification Search
CPC .......... G06T 2207/20221; G06V 10/56; G06V 10/60; G06V 40/00; H04N 1/60
See application file for complete search history.

(56) References Cited

U.S. PATENT DOCUMENTS

| | | | | |
|---|---|---|---|---|
| 2021/0118112 | A1 | 4/2021 | Huang et al. | |
| 2022/0058779 | A1 * | 2/2022 | Zou | G06T 7/11 |
| 2023/0260387 | A1 * | 8/2023 | Latham | G08B 23/00 340/517 |

FOREIGN PATENT DOCUMENTS

| | | | | | |
|---|---|---|---|---|---|
| CN | 109544633 | A | | 3/2019 | |
| CN | 109583509 | A | | 4/2019 | |
| CN | 112053366 | A | | 12/2020 | |
| CN | 112070137 | A | | 12/2020 | |
| CN | 112257548 | A | | 1/2021 | |
| CN | 113160231 | A | * | 3/2021 | G06T 11/60 |
| CN | 112614149 | A | | 4/2021 | |
| CN | 113449538 | A | | 9/2021 | |
| CN | 113537209 | A | | 10/2021 | |
| CN | 113887400 | A | | 1/2022 | |
| CN | 114373109 | A | | 4/2022 | |
| CN | 114581728 | A | | 6/2022 | |
| CN | 115359319 | A | | 11/2022 | |

OTHER PUBLICATIONS

Ling, Jun, et al. “Region-aware adaptive instance normalization for image harmonization.” Proceedings of the IEEE/CVF conference on computer vision and pattern recognition. 2021.
CN202211017275.7 first office action dated Jun. 27, 2025.

* cited by examiner

Figure 1:
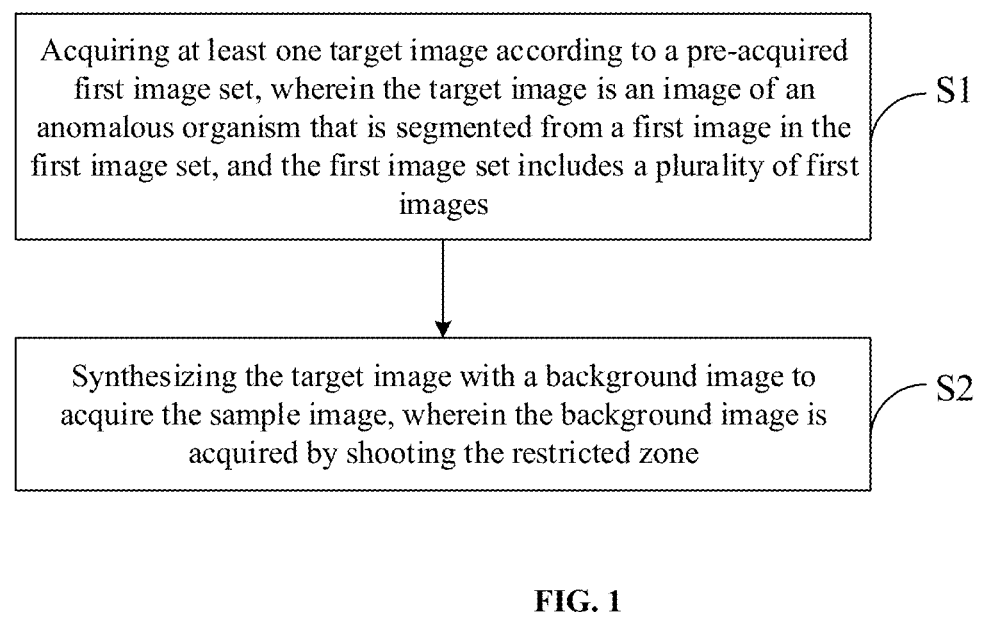

Acquiring at least one target image according to a pre-acquired first image set, wherein the target image is an image of an anomalous organism that is segmented from a first image in the first image set, and the first image set includes a plurality of first images

S1

Synthesizing the target image with a background image to acquire the sample image, wherein the background image is acquired by shooting the restricted zone

METHOD AND DEVICE FOR GENERATING IMAGE SET, AND COMPUTER-READABLE STORAGE MEDIUM

CROSS-REFERENCE TO RELATED APPLICATIONS

This application is a U.S. national phase application based on PCT/CN2023/110271, filed on Jul. 31, 2023, which claims priority to Chinese Patent Application No. 202211017275.7, filed on Aug. 23, 2022 and entitled "METHOD, APPARATUS, AND DEVICE FOR GENERATING IMAGE SET, AND COMPUTER-READABLE STORAGE MEDIUM", all of which are hereby incorporated by reference in their entireties for all purposes.

TECHNICAL FIELD

The present disclosure relates to the field of image processing, and in particular, relates to a method and a device for generating an image set, and a computer-readable storage medium.

BACKGROUND

To protect life or property safety, pedestrians or animals are strictly prohibited from entering some regions to avoid safety hazards. Therefore, it is necessary to detect an anomalous organism in a restricted zone that people or animals are prohibited from entering.

SUMMARY

Embodiments of the present disclosure provide a method, an apparatus, and a device for generating an image set, and a computer-readable storage medium.

According to a first aspect, some embodiments of the present disclosure provide a method for generating an image set, wherein the image set is configured to train a detection model for an anomalous organism in a restricted zone and includes a plurality of sample images; and the method includes generating each sample image according to steps as below:

- acquiring at least one target image according to a pre-acquired first image set, wherein the target image is an image of the anomalous organism that is segmented from a first image in the first image set, and the first image set includes a plurality of first images; and
- synthesizing the target image with a background image to acquire the sample image, wherein the background image is acquired by shooting the restricted zone.

In some embodiments, acquiring the at least one target image according to the pre-acquired first image set includes:

- performing instance segmentation processing on each first image in the first image set to acquire a target image set corresponding to each first image, wherein the target image set includes at least one target image.

In some embodiments, performing the instance segmentation processing on each first image in the first image set to acquire the target image set corresponding to each first image includes:

- inputting the first image into an instance segmentation network for processing to acquire the target image set.

In some embodiments, the background image is acquired by shooting the restricted zone using a target device; and

- synthesizing the target image with the background image to acquire the sample image includes:
- determining, according to corresponding coordinates of a to-be-pasted position, device parameters of the target device, an image dimension of the background image, and a preset dimension of the anomalous organism, a target dimension parameter used for synthesizing the target image into the background image, wherein the to-be-pasted position is a position of the target image in the background image in the case that the target image is synthesized with the background image;
- acquiring an adjusted target image by performing dimension adjustment on the target image based on the target dimension parameter; and
- performing image synthesis on the adjusted target image and the background image to acquire the sample image.

In some embodiments, before determining the target dimension parameter, the method further includes:

- determining a plurality of image regions in the background image by performing semantic segmentation processing on the background image; and using one of the plurality of image regions as a target region; and
- determining any position in the target region as the to-be-pasted position.

In some embodiments, determining the plurality of image regions in the background image by performing the semantic segmentation processing on the background image includes:

- inputting the background image into a semantic segmentation network for processing to acquire the plurality of image regions.

In some embodiments, the device parameters of the target device include at least: a mounting height of the target device, a focal length of the target device, and an included angle between an optical axis of the target device and a vertical direction; and

- determining, according to the corresponding coordinates of a to-be-pasted position, the device parameters of the target device, the image dimension of the background image, and the preset dimension of the anomalous organism, the target dimension parameter used for synthesizing the target image into the background image includes:
- determining a first angle based on the corresponding coordinates of the to-be-pasted position and the focal length of the target device, wherein the first angle is an included angle between the optical axis of the target device and a connection line between a position of the target device and a bottom position of the anomalous organism;
- determining a second angle based on the first angle, the mounting height of the target device, the included angle between the optical axis of the target device and the vertical direction, and the preset dimension of the anomalous organism, wherein the preset dimension of the anomalous organism is determined according to a type of the anomalous organism; the second angle is an included angle between a first connection line and a second connection line; the first connection line is the connection line between the position of the target device and the bottom position of the anomalous organism; and the second connection line is a connection line between the position of the target device and a top position of the anomalous organism; and
- determining the target dimension parameter based on the first angle, the second angle, and the image dimension.

In some embodiments, acquiring the adjusted target image by performing the dimension adjustment on the target image based on the target dimension parameter includes:

determining an adjustment proportion of the target image based on the image dimension and the target dimension parameter; and performing width adjustment and height adjustment on the target image separately based on the adjustment proportion to acquire the adjusted target image.

In some embodiments, performing the image synthesis on the adjusted target image and the background image to acquire the sample image includes:

determining a correction position in the adjusted target image according to a type of the anomalous organism;

acquiring a first image by pasting the adjusted target image into the background image, wherein in the first image, the correction position is aligned with the to-be-pasted position in the background image; and performing color adjustment on the first image to acquire the sample image, wherein the color adjustment includes brightness adjustment and/or chroma adjustment.

In some embodiments, performing the color adjustment on the first image to acquire the sample image includes:

acquiring a second image by setting a region in the first image and different from a region of the target image to a first preset color; and performing color adjustment on the first image by inputting the first image and the second image into a color neural network to acquire the sample image.

According to a second aspect, some embodiments of the present disclosure provide a device for generating an image set, wherein the device includes a processor and a memory storing at least one computer program, wherein the at least one computer program, when loaded and executed by the processor, causes the processor to perform the method according to the first aspect.

According to a third aspect, some embodiments of the present disclosure provide a computer-readable storage medium storing at least one computer program, wherein the at least one computer program, when loaded and executed by a processor, causes the processor to perform the method according to the first aspect.

BRIEF DESCRIPTION OF DRAWINGS

The accompanying drawings are provided for further understanding of the present disclosure, and constitute part of the description. The accompanying drawings and the following specific embodiments are intended to explain the present disclosure, rather than to limit the present disclosure. In the accompanying drawings:

FIG. 1 is a schematic flowchart of a method for generating an image set according to some embodiments of the present disclosure;

DETAILED DESCRIPTION

Figure 2:
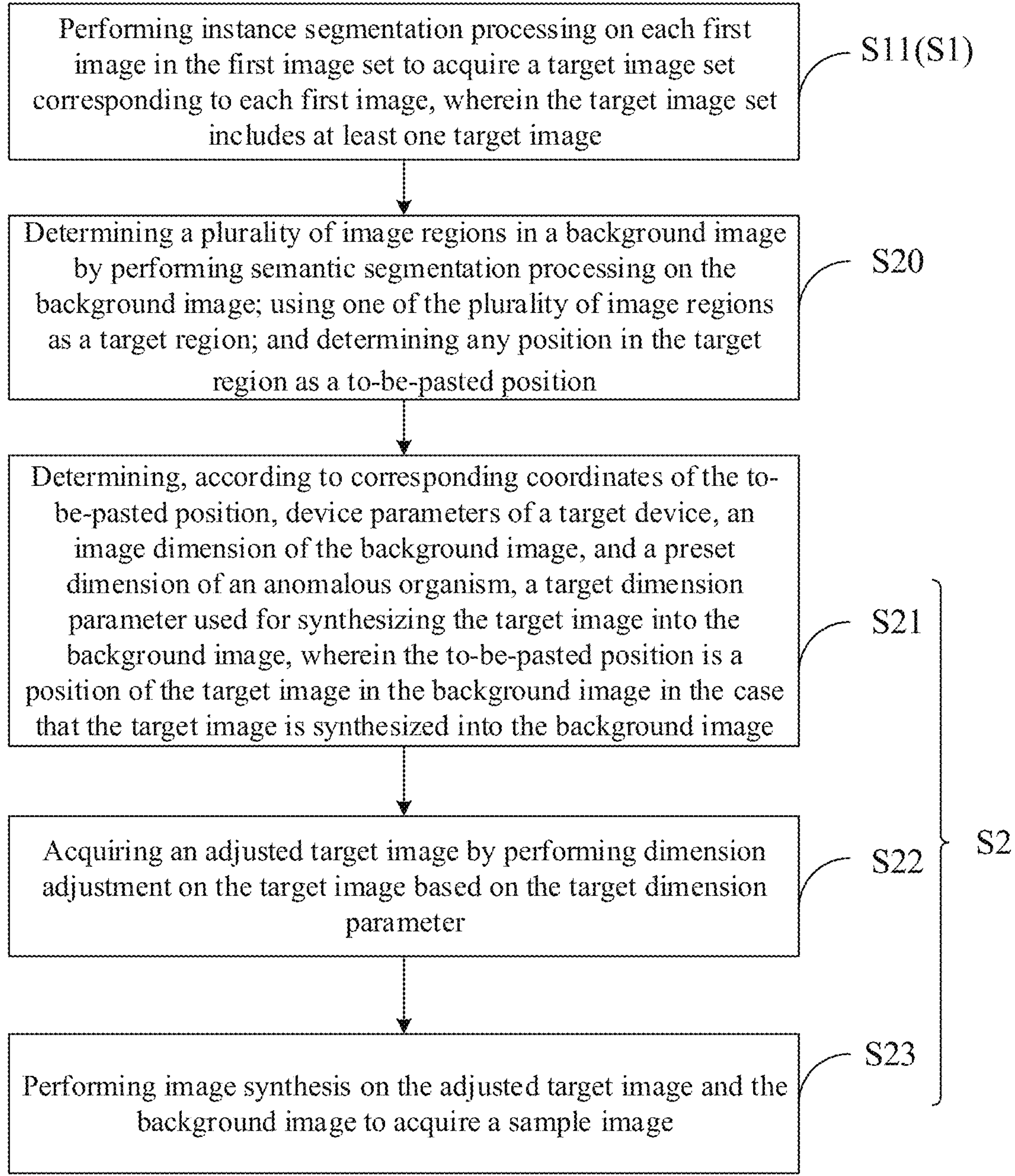
FIG. 2 is a schematic flowchart of another method for generating an image set according to some embodiments of the present disclosure.

Specific embodiments of the present disclosure are described in detail below with reference to the accompanying drawings. It should be understood that the specific embodiments described herein are merely intended to illustrate and explain the present disclosure rather than to limit the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by those of ordinary skill in the art based on the described embodiments of the present disclosure without creative efforts should fall within the protection scope of the present disclosure.

Unless otherwise defined, the technical terms or scientific terms used in the embodiments of the present disclosure should have general meanings understood by those of ordinary skill in the field to which the present disclosure belongs. Words "first", "second", and the like used in the present disclosure are merely used to distinguish different parts, instead of indicating any particular order, quantity, or importance. Similarly, "include", "comprise", or a similar word indicates that an element or article before the word covers elements, articles, or equivalents listed after the word, without precluding the possibility of covering other elements or articles. "Connection", "connect", or a similar word is not limited to a physical or mechanical connection, and may include an electrical connection, and the connection may be direct or indirect. Words "on", "under", "left", "right", and the like are merely used to indicate relative location relationships. After an absolute position of a described object is changed, its relative position relationship may also be changed accordingly.

To protect life or property safety, pedestrians or animals are strictly prohibited from entering some regions to avoid safety hazards. Therefore, it is necessary to detect an anomalous organism in a restricted zone that people or animals are prohibited from entering.

In the related art, a target detection algorithm based on a deep learning network is used to detect whether an anomalous organism appears in a restricted zone. The deep learning network usually requires a large quantity of data sets for training and generation. However, for a restricted zone, there is no anomalous organism in most of images shot in the restricted zone. Therefore, although the above target detection algorithm is highly precise, the deep learning network is trained with a large number of images that do not have any anomalous organisms, the detection accuracy of the trained deep learning network cannot meet a detection requirement.

Based on this, in the related art, it is proposed that an image set may be generated via image synthesis. Specifically, a target image including an anomalous organism is synthesized into a background image including an environment of the restricted zone to generate an image set used for training a deep learning network, thereby improving the detection accuracy of the deep learning network. However, the above image synthesis method suffers from the problems of the target image being too obtrusive due to an incongruous proportion of the target image, and the image being unrealistic due to inconsistency in chroma and/or brightness of the target image and the background image.

To solve at least one of the above technical problems, some embodiments of the present disclosure provide a method for generating an image set. The image set is configured to train a detection model for an anomalous organism in a restricted zone.

FIG. 1 is a schematic flowchart of a method for generating an image set according to some embodiments of the present disclosure. The image set includes a plurality of sample images. As shown in FIG. 1, the method for generating the image set includes generating each sample image according to the following steps:

In S1, at least one target image is acquired according to a pre-acquired first image set, wherein the target image is an image of the anomalous organism that is segmented from a first image in the first image set, and the first image set includes a plurality of first images.

It should be noted that the first image set is selected from existing image sets, and that each first image in the first image set is an image including an anomalous organism. The anomalous organism herein is an organism that is prohibited from entering a restricted zone, for example, a person or another animal.

In S2, the target image is synthesized with a background image to acquire the sample image, wherein the background image is acquired by shooting the restricted zone.

According to the method for generating the image set in the embodiments of the present disclosure, the target image is acquired based on the first image set, and the target image including the anomalous organism is synthesized with the background image including an environment of the restricted zone to acquire the sample image. Because the above sample image includes the anomalous organism, a detection model acquired via training based on an image set composed of a plurality of the sample images is used for detecting the anomalous organism in the restricted zone, the accuracy of the detection can be improved.

FIG. 2 is a schematic flowchart of another method for generating an image set according to some embodiments of the present disclosure. In some embodiments, as shown in FIG. 2, step S1 may include S11.

In S11, instance segmentation processing is performed on each first image in the first image set to acquire a target image set corresponding to each first image, wherein the target image set includes at least one target image. The above instance segmentation is framing out different instances in an image according to a target detection method, and performing pixel-by-pixel marking on different instance regions according to a semantic segmentation algorithm to segment out at least one target.

In the process of generating the target image, there is a requirement for the accuracy of the instance segmentation, and there is no limitation to the speed of the instance segmentation. Therefore, in the embodiments of the present disclosure, the instance segmentation processing is performed by using a two-stage network having high segmentation accuracy, for example, a Mask R-CNN instance segmentation network.

Optionally, step S11 may include: inputting the first image into a pre-trained Mask R-CNN instance segmentation network for processing to acquire the target image set. Because the first image may include at least one anomalous organism, after the instance segmentation processing, at least one target image may be segmented out, and a target image set is formed.

Figure 3:
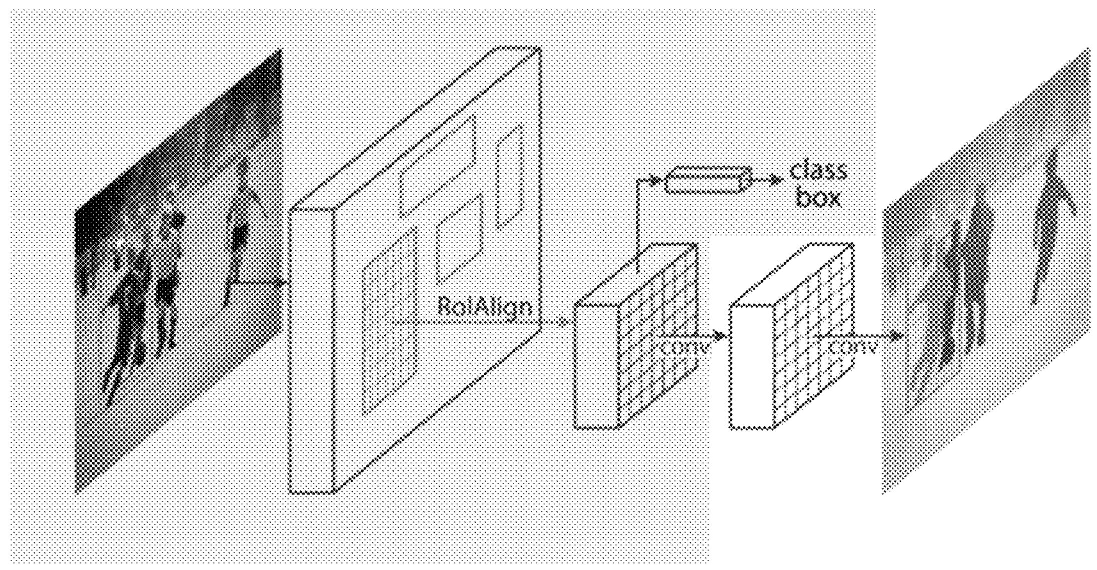
FIG. 3 is a schematic diagram of a framework of a Mask R-CNN instance segmentation network according to some embodiments of the present disclosure.

FIG. 3 is a schematic diagram of a framework of a Mask R-CNN instance segmentation network according to some embodiments of the present disclosure. As shown in FIG. 3, an image is input into a region of interest (ROI) align network, and a pooling operation is performed according to a "bilinear interpolation" algorithm to acquire a feature image. Based on the size of a region of interest in the feature image and the degree of the pooling operation, the above feature image is divided into a plurality of class boxes, and finally, a convolution (conv) operation is performed to accurately segment the input image. An advantage of the Mask R-CNN instance segmentation network is that an ROI Align operation (namely, the "bilinear interpolation" algorithm) is used, such that no quantization error is introduced. Therefore, a pixel in the input image and a pixel in the feature image are completely consistent without difference, and the accuracy of detection is improved.

Figure 4A:
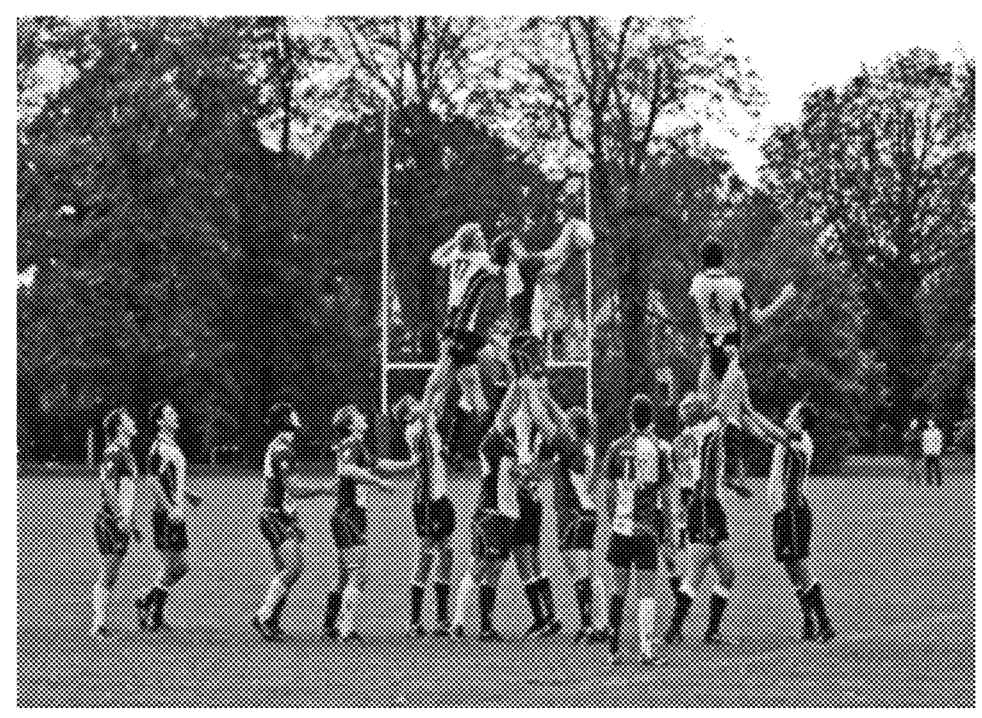
FIG. 4*a* is an original image according to some embodiments of the present disclosure.
Figure 4B:
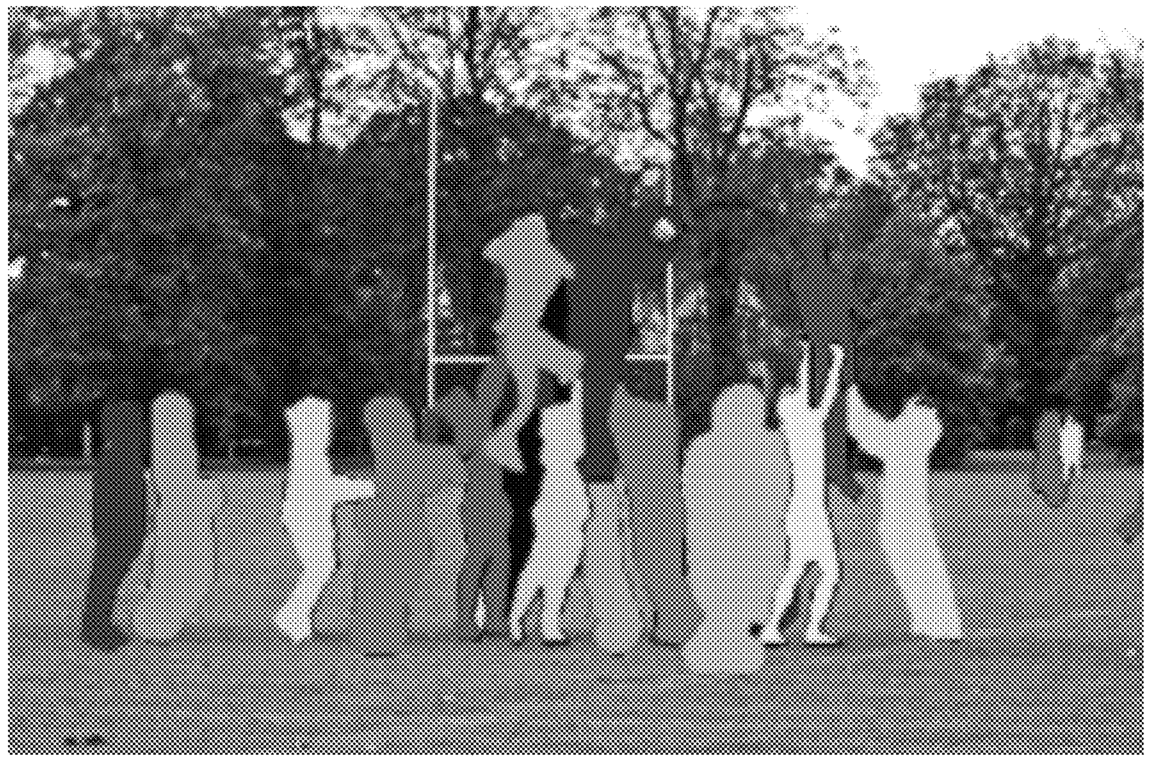
FIG. 4*b* is an image acquired after instance segmentation processing of FIG. 4*a*.

FIG. 4*a* is an original image according to some embodiments of the present disclosure. FIG. 4*b* is an image acquired after instance segmentation processing of FIG. 4*a*. In an example, as shown in FIG. 4*a* and FIG. 4*b*, a target person in an image may be segmented out from the image based on a Mask R-CNN instance segmentation network according to an instance segmentation technology; and different target persons can be distinguished from each other.

Figure 5:
FIG. 5 is a schematic diagram of a target image set according to some embodiments of the present disclosure.

FIG. 5 is a schematic diagram of a target image set according to some embodiments of the present disclosure. Each target image in the target image set may be stored in a PNG format with a transparent background. It should be noted that the plurality of target images in the target image set shown in FIG. 5 may be segmented out from one first image, or may be segmented out from a plurality of first images, and the embodiments of the present disclosure are not limited thereto.

In some embodiments, as shown in FIG. 2, before step S21, the method for synthesizing the image set may further include S20.

In S20, a plurality of image regions in the background image are determined by performing semantic segmentation processing on the background image; one of the plurality of image regions is used as a target region; and any position in the target region is determined as a to-be-pasted position.

The process of synthesizing the target image with the background image may be simply regarded as pasting the target image onto the background image, wherein the to-be-pasted position is a position to which the target image is placed on the background image in the process of synthesizing the target image with the background image. For a scenario in which detection is performed for intrusion of an anomalous organism in a restricted zone, the placement of the target image on the background image, i.e., the to-be-pasted position, needs to be reasonably selected to ensure the authenticity of the sample image.

Specifically, a semantic segmentation technology is used to segment out different regions in the background image; and a to-be-pasted region is selected according to the segmentation result. For example, for a scenario in which detection is performed on a lake surface for a target that falls into water, the target image is pasted on only a region including the lake surface; and for a scenario in which detection is performed on a lawn for treading, the target image is pasted on only a region including the lawn.

In the embodiments of the present disclosure, a U-Net semantic segmentation network is used to process the background image, thereby ensuring the accuracy of a segmented-out image region. In some embodiments, determining the plurality of image regions in the background image by performing semantic segmentation processing on the background image in S20 may specifically include: inputting the background image into a pre-trained U-Net semantic segmentation network for processing to acquire the plurality of image regions.

Figure 6:
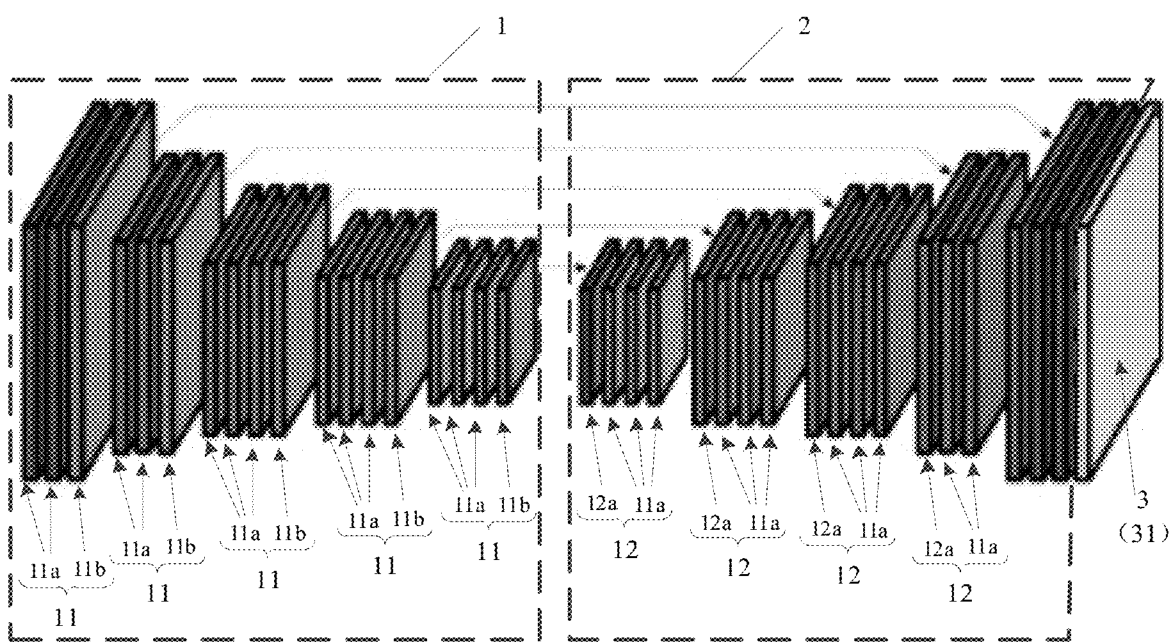
FIG. 6 is a schematic diagram of a framework of a U-Net semantic segmentation network according to some embodiments of the present disclosure.

FIG. 6 is a schematic diagram of a framework of a U-Net semantic segmentation network according to some embodiments of the present disclosure. As shown in FIG. 6, the U-Net semantic segmentation network includes a first module 1, a second module 2, and a third module 3. The first module 1 includes a plurality of first units 11. Each first unit 11 includes a plurality of first networks 11*a* and a pooling network (Pooling) 11*b*. The second module includes a plurality of second units 12. Each second unit 12 includes an up-sampling network (Upsampling) 12*a* and a plurality of first networks 11*a*, and corresponds to a first unit 11. The third module 3 includes a regression network 31 (Softmax). Through convolution (conv) and batch normalization operations in combination with an activation function (ReLU), the first network 11*a* transforms a low-resolution image containing a high-dimensional feature into a high-resolution image while the high-dimensional feature is retained.

Specifically, an original image is input into the $1^{st}$ first unit 11 in the first module. An output image of each first unit 11 (except the last one) in the first module is input into a first unit 11 of a lower level. After feature extraction via continuous convolution and pooling processing, each first unit 11 inputs a feature image into a corresponding second unit 12. A feature image processed by each second unit 12 (except the last one) in the second module 2 is also input into a second unit 12 of a lower level. In other words, each second unit 12 (except the $1^{st}$ one) performs feature fusion on a feature image input by the corresponding first unit 11 and a feature image input by a second unit 12 of a higher level; then, up-sampling processing is performed with reference to an activation function; and the last-level second unit 12 inputs a processed feature image into the third module 3. A loss function is calculated via the regression network 31 in the third module 3. A final result of region segmentation is output in the case that the loss function meets the requirement of a preset function.

Figure 7:
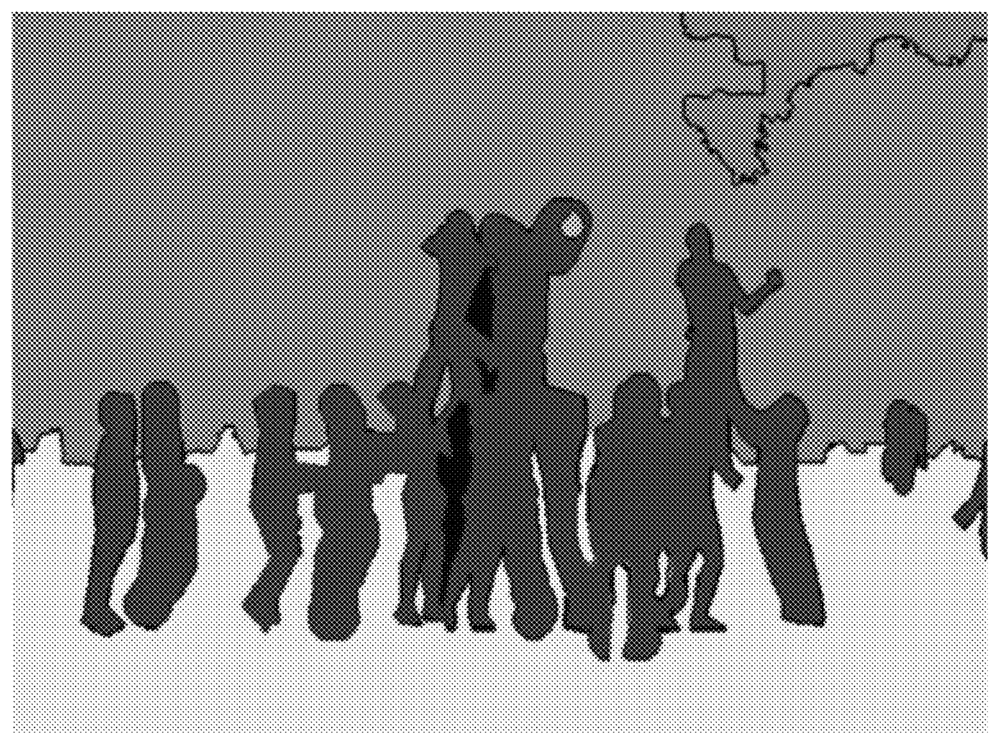
FIG. 7 is an image acquired after semantic segmentation processing of FIG. 4*a*.

FIG. 7 is an image acquired after semantic segmentation processing of FIG. 4*a*. In an example, as shown in FIG. 4*a* and FIG. 7, the scenario in FIG. 4*a* is segmented into different regions based on the U-Net semantic segmentation network. A segmentation result is shown in FIG. 7. Different colors may be used to represent regions that are in the image and contain a crowd, a tree, a lawn, and a sky respectively.

In some embodiments, as shown in FIG. 2, step S2 may include step S21 to step S23.

In step S21, a target dimension parameter used for synthesizing the target image into the background image is determined according to corresponding coordinates of the to-be-pasted position, device parameters of a target device, an image dimension of the background image, and a preset dimension of the anomalous organism, wherein the to-be-pasted position is a position of the target image in the background image in the case that the target image is synthesized into the background image. The corresponding coordinates of the to-be-pasted position are coordinates of the to-be-pasted position in the background image.

The target device is a device used for shooting the restricted zone to acquire the background image.

The above target dimension parameter is determined in consideration of the following points: First, in the case that a target device and a shooting angle are determined, if an object to be shot is at different positions in a shooting environment, different proportions relative to a background environment are formed in an imaging picture. For example, in the same background, a target body closer to a lens has a larger picture proportion to the imaging picture. Second, different devices have different device parameters. As a result, even if the same scene is shot at the same position, pictures having different effects are formed. Finally, the target dimension parameter is a dimension of the target image in the background image. Therefore, to ensure the authenticity of an image, it is also necessary to take the preset dimension of the anomalous organism and the image dimension of the background image into consideration to acquire a real image to the greatest extent.

The target dimension parameter may be a height parameter used for synthesizing the target image into the background image, or may be a width parameter for used for synthesizing the target image into the background image, which is not limited in this embodiment of the present disclosure.

With reference to an accompanying drawing, a process of determining a target dimension parameter is described below by using an example that the target dimension parameter is a height parameter.

Figure 8:
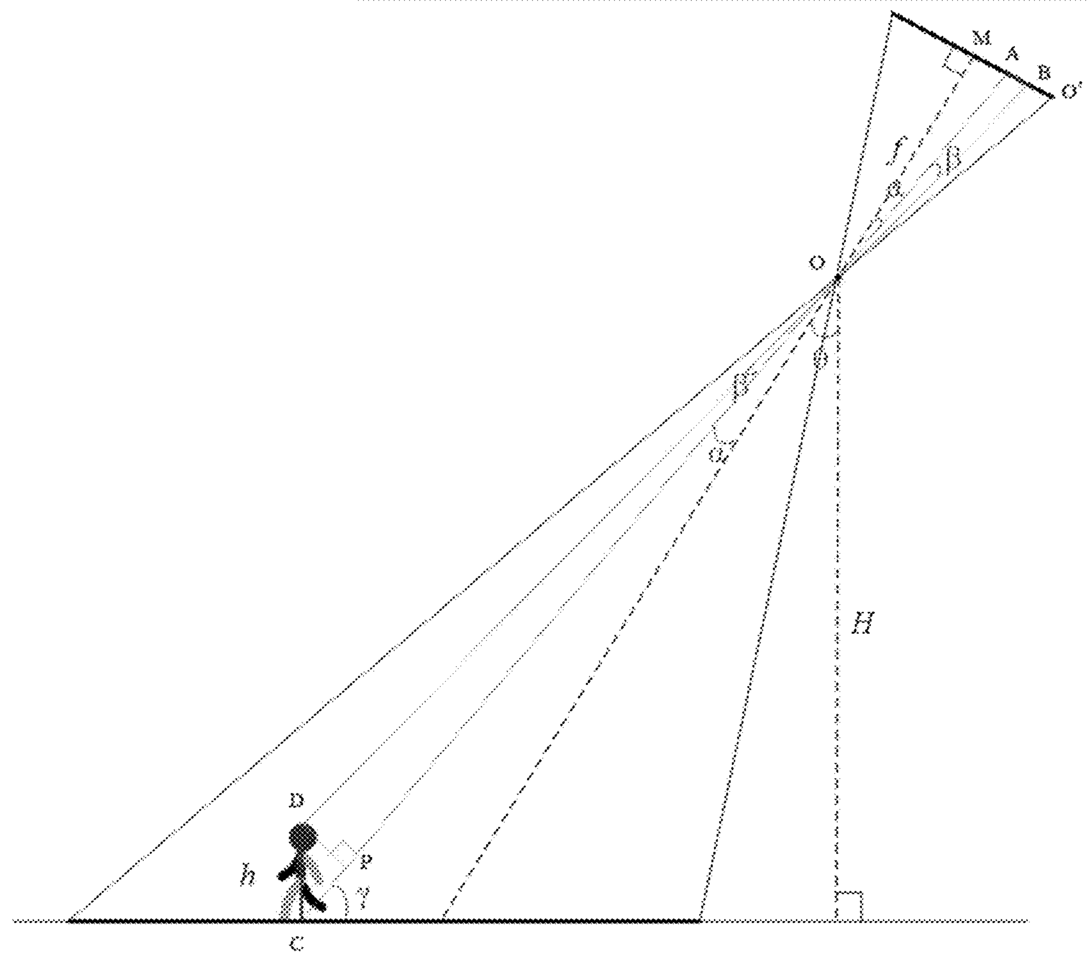
FIG. 8 is a schematic diagram of an imaging principle of a camera according to some embodiments of the present disclosure.

FIG. 8 is a schematic diagram of an imaging principle of a camera according to some embodiments of the present disclosure. With reference to the above analysis, as shown in FIG. 8, corresponding coordinates O' of a to-be-pasted position, device parameters of a target device, an image dimension image_h of a background image, and a preset dimension h of an anomalous organism all negatively affect a target dimension parameter. The device parameters of the target device include at least: a mounting height H of the target device, a focal length f of the target device, and an included angle θ between an optical axis of the target device and a vertical direction.

It should be noted that as shown in FIG. 8, according to the imaging principle of the camera, a position of the anomalous organism is CD, the position is mapped onto the position O'A in the image after being shot by the target device at the point O.

In some embodiments, step S21 may specifically include the following contents.

A first angle α is determined based on the corresponding coordinates of the to-be-pasted position and the focal length of the target device, Specifically, the first angle may be expressed by formula 1. The first angle α is an included angle between the optical axis of the target device and a connection line OC between a position O of the target device and a bottom position C of the anomalous organism.

$$\alpha = \arctan\frac{AM}{f} \quad \text{Formula 1}$$

A second angle β is determined based on the first angle α, the mounting height H of the target device, the included angle θ between the optical axis of the target device and the vertical direction, and the preset dimension h of the anomalous organism. Specifically, the second angle may be expressed by formula 2. The second angle β is an included angle between a first connection line and a second connection line. The first connection line is the connection line OC between the position O of the target device and the bottom position of the anomalous organism. The second connection line is a connection line OD between the position O and a top position D of the anomalous organism.

In addition, the preset dimension of the anomalous organism is a dimension related to the type of the anomalous organism and similar to the real dimension of the anomalous organism (the dimension herein may be a height). The preset dimension of the anomalous organism is determined based on the type of the anomalous organism. Anomalous organisms of the same type have the same preset dimension. For example, the preset dimension of the anomalous organism is determined according to a pre-stored table of mapping relationships between preset dimensions and organism types. Preset dimensions corresponding to a plurality of organism types may be stored in the table of mapping relationships. For example, in the case that the anomalous organism is a pedestrian, the preset dimension may be set to 1.6 m, 1.75 m, or the like. In the case that the anomalous organism is a dog, the preset dimension may be set to 0.3 m, 0.5 m, or the like.

$$\gamma = 90^o - \theta - \alpha \quad \text{Formula 2}$$

$$OC = \frac{H}{\sin\gamma}$$

$$CP = h \cdot \cos(90^o - \gamma)$$

$$DP = CP \cdot \tan(90^o - \gamma)$$

$$\beta = \arctan\frac{DP}{OP} = \arctan\frac{DP}{OC - CP}$$

A target dimension parameter AB is determined based on the first angle α, the second angle β, and the image dimension image_h. Specifically, the target dimension parameter may be expressed by formula 3.

It should be noted that in the case that the target dimension parameter is a height parameter, the image dimension is the height of the image, and in the case that the target dimension parameter is a width parameter, the image dimension is the width of the image.

$$AB = f \cdot \tan(\alpha + \beta) - \left(\frac{\text{image}_h}{2} - O'A\right) \quad \text{Formula 3}$$

In S22, an adjusted target image is acquired by performing dimension adjustment on the target image based on the target dimension parameter.

In some embodiments, step S22 may specifically include:

determining an adjustment proportion of the target image based on the image dimension and the target dimension parameter; and performing width adjustment and height adjustment on the target image separately based on the adjustment proportion to acquire the adjusted target image.

In an example, the image dimension of the target image is a×b; and the target dimension parameter is c. In the case that the target dimension parameter is a height parameter, the adjustment proportion is c/a; and based on the adjustment proportion, the height of the target image is adjusted to c, and the width of the target image is adjusted to c/a×b, such that the adjusted target image is acquired. In the case that the target dimension parameter is a width parameter, the adjustment proportion is c/b; and based on the adjustment proportion, the width of the target image is adjusted to c, and the height of the target image is adjusted to c/b×a, such that the adjusted target image is acquired.

In S23, image synthesis is performed on the adjusted target image and the background image to acquire the sample image.

According to the method for generating the image set in the embodiments of the present disclosure, instance segmentation is performed on the pre-acquired first image set to acquire a target image set including at least one target image. Because the background image is acquired by shooting the restricted zone with a camera device, the authenticity of a sample image acquired by synthesizing a target image with a background image is improved by determining the target dimension parameter of the target image on the background image according to the imaging principle and adjusting the image dimension of the target image based on the target dimension parameter.

Figure 9:
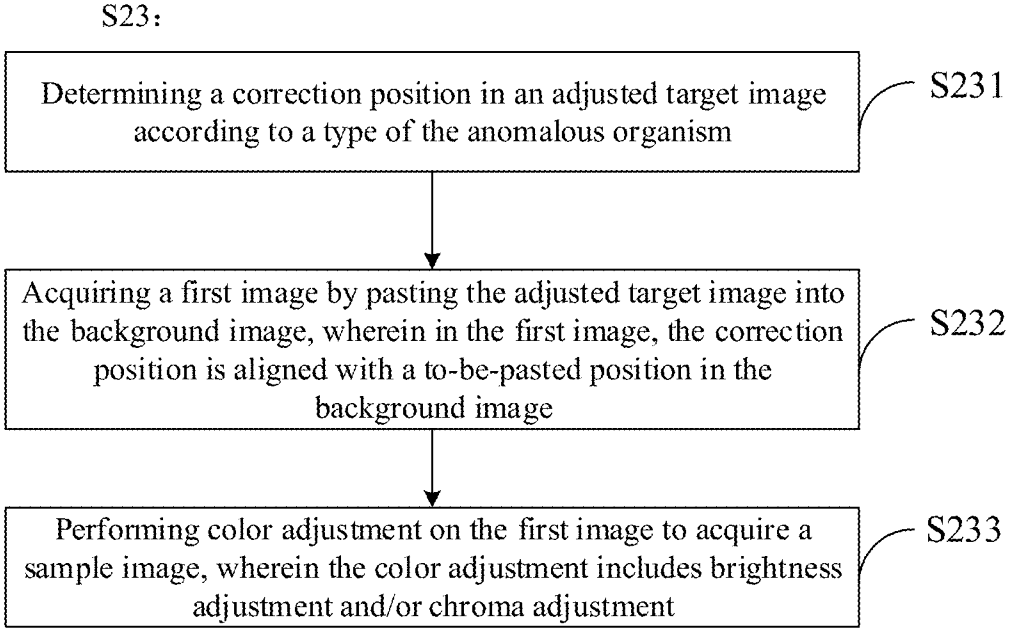
FIG. 9 is a schematic flowchart of another method for generating an image set according to some embodiments of the present disclosure.

FIG. 9 is a schematic flowchart of another method for generating an image set according to some embodiments of the present disclosure. In some embodiments, as shown in FIG. 9, step S23 may specifically include step S231 to step S233.

In S231, a correction position in the adjusted target image is determined according to the type of the anomalous organism.

For example, in the case that people are prohibited from entering the restricted zone, the type of the anomalous organism is human, and the correction position of the adjusted target image is the position of the foot of a person in the image.

In S232, a first image is acquired by pasting the adjusted target image into the background image, wherein in the first image, the correction position is aligned with the to-be-pasted position in the background image.

In S233, color adjustment is performed on the first image to acquire the sample image, wherein the color adjustment includes brightness adjustment and/or chroma adjustment.

After the adjusted target image is pasted into the background image, the first image acquired after the pasting has discordant colors due to differences in illumination and the like. Therefore, color adjustment is performed on the first image by using a color neural network, with the illumination of the background image used as a reference.

In some embodiments, step S233 may specifically include:

acquiring a second image by setting a region in the first image and different from a region of the target image to a first preset color; and performing color adjustment on the first image by inputting the first image and the second image into a color neural network to acquire the sample image. In an example, the first preset color is black, that is, pixels of the region in the first image and different from the region of the target image are set to 0.

Figure 10:
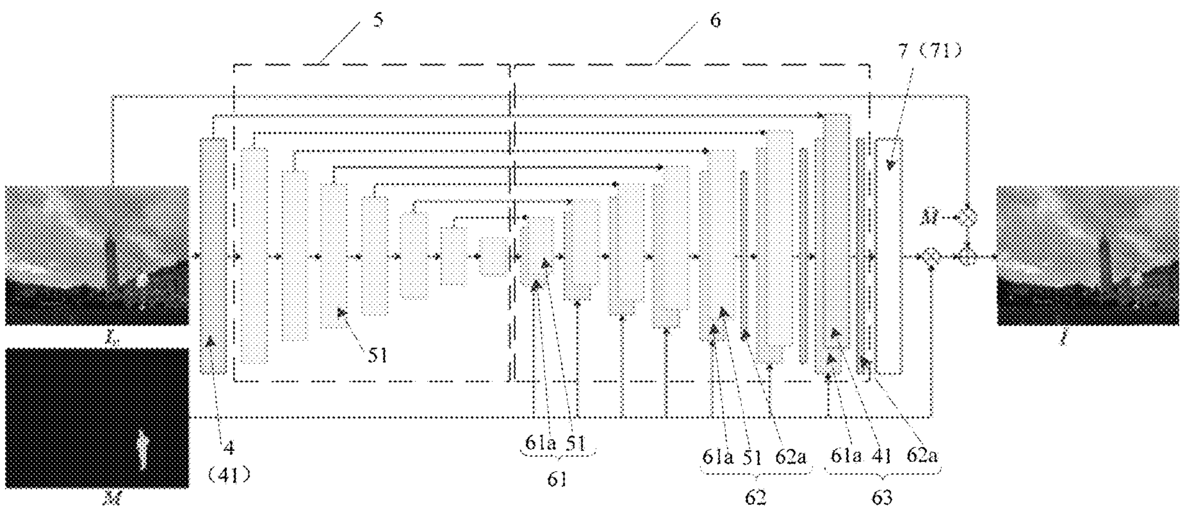
FIG. 10 is a schematic diagram of a framework of a RainNet neural network according to some embodiments of the present disclosure.

Specifically, the color neural network may be a RainNet neural network. Style transfer is performed on the pasted target image by using the background image as a reference, such that the target image is better fused with the background image. FIG. 10 is a schematic diagram of a framework of a RainNet neural network according to some embodiments of the present disclosure. As shown in FIG. 10, the RainNet neural network includes a first convolution module 4, a second convolution module 5, a third convolution module 6, and a deconvolution module 7. The first convolution module 4 includes a convolution network 41. The deconvolution module 7 includes a deconvolution network 71. The second convolution module 5 includes a plurality of second convolution networks 51 based on a rectified activation function (LReLU). The third convolution module 6 includes a plurality of cascaded convolution units, and specifically includes a plurality of first convolution units 61, a plurality of second convolution units 62, and a third convolution unit 63. The first convolution unit 61 includes a second convolution network 51 and a deconvolution network 61*a* that is based on the activation function. The second convolution unit 62 includes a second convolution network 51, a deconvolution network 61*a* based on the activation function, and a self-attention network 62*a*. The third convolution unit 63 includes a deconvolution network 61*a* based on the activation function, a convolution network 41, and a self-attention network 62*a*.

Specifically, the RainNet neural network extracts a high-dimensional feature by performing multi-layer convolution processing on a first image Ic with the first convolution module 4 and the second convolution module 5, and inputs the high-dimensional feature into the third convolution module 6. The third convolution module 6 inputs together first images input by each level of second convolution networks 51 and second images M having the same resolution as the first images, calculates $Ic\times(1-M)$ to acquire a background region in Ic, and calculates $Ic\times M$ to acquire a foreground region in Ic. The deconvolution module 7 calculates statistical style parameters $\gamma i$ and $\beta i$. The values of $\gamma i$ and $\beta i$ are multiplied. The product is added to a normalization foreground feature $\overline{M}$ in a channeling fashion to acquire a sample image $\hat{I}$. Therefore, color balancing is achieved, making content of pictures in the sample image $\hat{I}$ more coordinated and improving the authenticity of the sample image.

Figure 11:
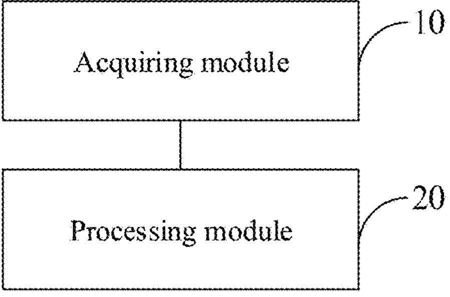
FIG. 11 is a schematic structural diagram of an apparatus for generating an image set according to some embodiments of the present disclosure.

FIG. 11 is a schematic structural diagram of an apparatus for generating an image set according to some embodiments of the present disclosure. The apparatus is configured to perform the above method for generating the image set. As shown in FIG. 11, the apparatus for generating the image set includes an acquiring module 10 and a processing module 20.

The acquiring module 10 is configured to acquire at least one target image according to a pre-acquired first image set, wherein the target image is an image of the anomalous organism that is segmented from a first image in the first image set, and the first image set includes a plurality of first images.

The processing module 20 is configured to synthesize the target image with a background image to acquire the sample image, wherein the background image is acquired by shooting the restricted zone.

The functions of the modules can refer to the above description of the method for generating the image set, details of which are not described herein.

Figure 12:
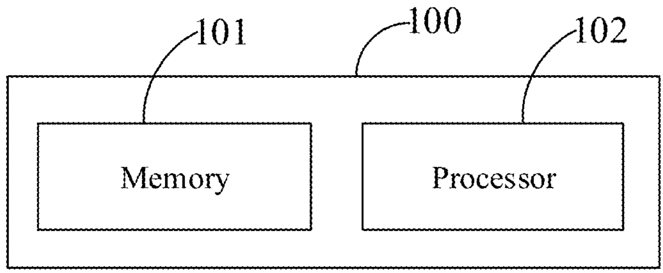
FIG. 12 is a schematic structural diagram of a device for generating an image set according to some embodiments of the present disclosure.

FIG. 12 is a schematic structural diagram of a device for generating an image set according to some embodiments of the present disclosure. As shown in FIG. 12, the electronic device 100 includes a memory 101 and a processor 102. The memory 101 stores at least one computer program. The at least one computer program, when loaded and executed by the processor 102, causes the processor 102 to perform the above method for generating the image set, such as steps S1 and S2 in FIG. 1.

The electronic device 100 may be a computing device, such as a desktop computer, a notebook, a palmtop computer, or a cloud server. The electronic device 100 may include but is not limited to the processor 102 and the memory 101. Those skilled in the art may understand that FIG. 12 shows only an example of the electronic device 100, does not constitute a limitation to the electronic device 100, and may include more or fewer components than those shown in the figure, a combination of some components, or different components. For example, the electronic device 100 may further include an input/output device, a network access device, a bus, and the like.

The processor 102 may be a central processing unit (CPU), or may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor 102 may be a microprocessor, or the processor may be any conventional processor, or the like.

The memory 101 may be an internal storage unit of the electronic device 100, for example, a hard disk or an internal storage of the electronic device 100. The memory 101 may alternatively be an external storage device of the electronic device 100, for example, a plug-in hard disk, a smart media card (SMC), a secure digital (SD) card, or a flash card that is equipped on the electronic device 100. Further, the memory 101 may alternatively include both an internal storage unit of the electronic device 100 and an external storage device. The memory 101 is configured to store the computer program and other programs and data required by the electronic device. The memory 101 may be further configured to temporarily store data that has been output or is to be output.

A person skilled in the art may clearly understand that for the purpose of convenient and brief descriptions, division into the functional units or modules is merely used as an example for description. In an actual application, the functions can be allocated to different functional units or modules for implementation as required. In other words, an inner structure of the apparatus is divided into different functional units or modules, to implement all or some of the functions described above. The functional units or modules in this embodiment may be integrated into one processing unit, or each unit may exist alone physically, or two or more units may be integrated into one unit. The integrated unit may be implemented either in the form of hardware or in the form of a software functional unit. In addition, specific names of the functional units or modules are merely for convenience of distinguishing from each other, and are not intended to limit the protection scope of the present disclosure. Specific working processes of the units or modules in the system can refer to the corresponding processes in the above method embodiment, details of which are not described herein.

Figure 13:
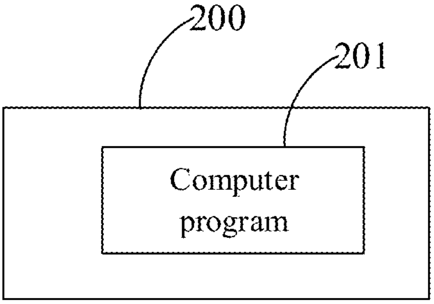
FIG. 13 is a schematic structural diagram of a computer-readable storage medium according to some embodiments of the present disclosure.

FIG. 13 is a schematic structural diagram of a computer-readable storage medium according to some embodiments of the present disclosure. As shown in FIG. 13, the computer-readable storage medium 200 stores at least one computer program 201. The at least one computer program 201, when loaded and executed by a processor, causes the processor to perform the above method for generating the image set, such as steps S1 and S2 in FIG. 1. The computer-readable storage medium 200 includes but is not limited to a RAM, a ROM, an EEPROM, a flash memory or other storage technologies, a CD-ROM, a digital versatile disk (DVD) or other optical disc storage, a magnetic cassette, a magnetic tape, magnetic disk storage, or other magnetic storage apparatuses, or any other medium that can be used to store desired information and can be accessed by a computer. In addition, it is well known to those of ordinary skill in the art that communication media typically contain computer-readable instructions, data structures, program modules, or other data in a modulated data signal such as a carrier wave or another transmission mechanism, and may include any information transfer medium.

It can be understood that the above implementations are merely exemplary implementations used to illustrate the principle of the present disclosure, and the present disclosure is not limited thereto. Various variations and improvements can be made by those of ordinary skill in the art without departing from the spirit and essence of the present disclosure, and these variations and improvements are also considered as falling within the protection scope of the present disclosure.

The invention claimed is:

1. A method for generating an image set, wherein the image set is configured to train a detection model for an anomalous organism in a restricted zone and comprises a plurality of sample images; and the method comprises generating each sample image according to steps as below:

acquiring at least one target image according to a pre-acquired first image set, wherein the target image is an image of the anomalous organism that is segmented from a first image in the first image set; and synthesizing the target image with a background image to acquire the sample image, wherein the first image set comprises a plurality of first images, and the background image is acquired by shooting the restricted zone;

wherein the background image is acquired by shooting the restricted zone using a target device; and said synthesizing the target image with the background image to acquire the sample image comprises:

determining, according to corresponding coordinates of a to-be-pasted position, device parameters of the target device, an image dimension of the background image, and a preset dimension of the anomalous organism, a target dimension parameter used for synthesizing the target image into the background image, wherein the to-be-pasted position is a position of the target image in the background image in a case that the target image is synthesized with the background image;

acquiring an adjusted target image by performing dimension adjustment on the target image based on the target dimension parameter; and performing image synthesis on the adjusted target image and the background image to acquire the sample image.

2. The method for generating the image set according to claim 1, wherein said acquiring the at least one target image according to the pre-acquired first image set comprises:

performing instance segmentation processing on each first image in the first image set to acquire a target image set corresponding to each first image, wherein the target image set comprises at least one target image.

3. The method for generating the image set according to claim 2, wherein said performing the instance segmentation processing on each first image in the first image set to acquire the target image set corresponding to each first image comprises:

inputting the first image into an instance segmentation network for processing to acquire the target image set.

4. The method for generating the image set according to claim 1, wherein before determining the target dimension parameter, the method further comprises:

determining a plurality of image regions in the background image by performing semantic segmentation processing on the background image; and using one of the plurality of image regions as a target region; and determining any position in the target region as the to-be-pasted position.

5. The method for generating the image set according to claim 4, wherein said determining the plurality of image regions in the background image by performing the semantic segmentation processing on the background image comprises:

inputting the background image into a semantic segmentation network for processing to acquire the plurality of image regions.

6. The method for generating the image set according to claim 1, wherein the device parameters of the target device comprise at least: a mounting height of the target device, a focal length of the target device, and an included angle between an optical axis of the target device and a vertical direction; and said determining, according to the corresponding coordinates of a to-be-pasted position, the device parameters of the target device, the image dimension of the background image, and the preset dimension of the anomalous organism, the target dimension parameter used for synthesizing the target image into the background image comprises:

determining a first angle based on the corresponding coordinates of the to-be-pasted position and the focal length of the target device, wherein the first angle is an included angle between the optical axis of the target device and a connection line between a position of the target device and a bottom position of the anomalous organism;

determining a second angle based on the first angle, the mounting height of the target device, the included angle between the optical axis of the target device and the vertical direction, and the preset dimension of the anomalous organism, wherein the preset dimension of the anomalous organism is determined according to a type of the anomalous organism; the second angle is an included angle between a first connection line and a second connection line; the first connection line is the connection line between the position of the target device and the bottom position of the anomalous organism; and the second connection line is a connection line between the position of the target device and a top position of the anomalous organism; and determining the target dimension parameter based on the first angle, the second angle, and the image dimension.

7. The method for generating the image set according to claim 1, wherein said acquiring the adjusted target image by performing the dimension adjustment on the target image based on the target dimension parameter comprises:

determining an adjustment proportion of the target image based on the image dimension and the target dimension parameter; and performing width adjustment and height adjustment on the target image separately based on the adjustment proportion to acquire the adjusted target image.

8. The method for generating the image set according to claim 1, wherein said performing the image synthesis on the adjusted target image and the background image to acquire the sample image comprises:

determining a correction position in the adjusted target image according to a type of the anomalous organism;

acquiring a first image by pasting the adjusted target image into the background image, wherein in the first image, the correction position is aligned with the to-be-pasted position in the background image; and performing color adjustment on the first image to acquire the sample image, wherein the color adjustment comprises brightness adjustment and/or chroma adjustment.

9. The method for generating the image set according to claim 8, wherein said performing the color adjustment on the first image to acquire the sample image comprises:

acquiring a second image by setting a region in the first image and different from a region of the target image to a first preset color; and performing color adjustment on the first image by inputting the first image and the second image into a color neural network to acquire the sample image.

10. A device for generating an image set, comprising a processor and a memory storing at least one computer program, wherein the at least one computer program, when loaded and executed by the processor, causes the processor to perform a method for generating an image set, wherein the image set is configured to train a detection model for an anomalous organism in a restricted zone and comprises a plurality of sample images; and the method comprises generating each sample image according to steps as below:

acquiring at least one target image according to a pre-acquired first image set, wherein the target image is an image of the anomalous organism that is segmented from a first image in the first image set; and synthesizing the target image with a background image to acquire the sample image, wherein the first image set comprises a plurality of first images, and the background image is acquired by shooting the restricted zone;

wherein the background image is acquired by shooting the restricted zone using a target device; and the at least one computer program, when loaded and executed by the processor, causes the processor to perform:

determining, according to corresponding coordinates of a to-be-pasted position, device parameters of the target device, an image dimension of the background image, and a preset dimension of the anomalous organism, a target dimension parameter used for synthesizing the target image into the background image, wherein the to-be-pasted position is a position of the target image in the background image in a case that the target image is synthesized with the background image;

acquiring an adjusted target image by performing dimension adjustment on the target image based on the target dimension parameter; and performing image synthesis on the adjusted target image and the background image to acquire the sample image.

11. The device for generating the image set according to claim 10, wherein the at least one computer program, when loaded and executed by the processor, causes the processor to perform:

performing instance segmentation processing on each first image in the first image set to acquire a target image set corresponding to each first image, wherein the target image set comprises at least one target image.

12. The device for generating the image set according to claim 11, wherein the at least one computer program, when loaded and executed by the processor, causes the processor to perform:

inputting the first image into an instance segmentation network for processing to acquire the target image set.

13. The device for generating the image set according to claim 10, wherein the at least one computer program, when loaded and executed by the processor, causes the processor to perform:

determining a plurality of image regions in the background image by performing semantic segmentation processing on the background image; and using one of the plurality of image regions as a target region; and determining any position in the target region as the to-be-pasted position.

14. The device for generating the image set according to claim 13, wherein the at least one computer program, when loaded and executed by the processor, causes the processor to perform:

inputting the background image into a semantic segmentation network for processing to acquire the plurality of image regions.

15. The device for generating the image set according to claim 12, wherein the device parameters of the target device comprise at least: a mounting height of the target device, a focal length of the target device, and an included angle between an optical axis of the target device and a vertical direction; and the at least one computer program, when loaded and executed by the processor, causes the processor to perform:

determining a first angle based on the corresponding coordinates of the to-be-pasted position and the focal length of the target device, wherein the first angle is an included angle between the optical axis of the target device and a connection line between a position of the target device and a bottom position of the anomalous organism;

determining a second angle based on the first angle, the mounting height of the target device, the included angle between the optical axis of the target device and the vertical direction, and the preset dimension of the anomalous organism, wherein the preset dimension of the anomalous organism is determined according to a type of the anomalous organism; the second angle is an included angle between a first connection line and a second connection line; the first connection line is the connection line between the position of the target device and the bottom position of the anomalous organism; and the second connection line is a connection line between the position of the target device and a top position of the anomalous organism; and determining the target dimension parameter based on the first angle, the second angle, and the image dimension.

16. The device for generating the image set according to claim 12, wherein the at least one computer program, when loaded and executed by the processor, causes the processor to perform:

determining an adjustment proportion of the target image based on the image dimension and the target dimension parameter; and performing width adjustment and height adjustment on the target image separately based on the adjustment proportion to acquire the adjusted target image.

17. The device for generating the image set according to claim 12, wherein the at least one computer program, when loaded and executed by the processor, causes the processor to perform:

determining a correction position in the adjusted target image according to a type of the anomalous organism;

acquiring a first image by pasting the adjusted target image into the background image, wherein in the first image, the correction position is aligned with the to-be-pasted position in the background image; and performing color adjustment on the first image to acquire the sample image, wherein the color adjustment comprises brightness adjustment and/or chroma adjustment.

18. A non-transitory computer-readable storage medium storing at least one computer program, wherein the at least one computer program, when loaded and executed by a processor, causes the processor to perform a method for generating an image set, wherein the image set is configured to train a detection model for an anomalous organism in a restricted zone and comprises a plurality of sample images; and the method comprises generating each sample image according to steps as below:

acquiring at least one target image according to a pre-acquired first image set, wherein the target image is an image of the anomalous organism that is segmented from a first image in the first image set; and synthesizing the target image with a background image to acquire the sample image, wherein the first image set comprises a plurality of first images, and the background image is acquired by shooting the restricted zone;

wherein the background image is acquired by shooting the restricted zone using a target device; and said synthesizing the target image with the background image to acquire the sample image comprises:

determining, according to corresponding coordinates of a to-be-pasted position, device parameters of the target device, an image dimension of the background image, and a preset dimension of the anomalous organism, a target dimension parameter used for synthesizing the target image into the background image, wherein the to-be-pasted position is a position of the target image in the background image in a case that the target image is synthesized with the background image;

acquiring an adjusted target image by performing dimension adjustment on the target image based on the target dimension parameter; and performing image synthesis on the adjusted target image and the background image to acquire the sample image.

* * * * *